(12) United States Patent
Suzuki

(10) Patent No.: US 8,165,524 B2
(45) Date of Patent: Apr. 24, 2012

(54) DEVICES, METHODS, AND PROGRAMS FOR IDENTIFYING RADIO COMMUNICATION DEVICES

(75) Inventor: Kazuhiro Suzuki, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 489 days.

(21) Appl. No.: 12/385,504

(22) Filed: Apr. 9, 2009

(65) Prior Publication Data

US 2009/0270034 A1    Oct. 29, 2009

(30) Foreign Application Priority Data

Apr. 24, 2008    (JP) ................................. 2008-113425

(51) Int. Cl.
*H04B 5/00* (2006.01)
(52) U.S. Cl. .................... 455/41.2; 455/456.1
(58) Field of Classification Search ............... 455/41.2, 455/67.11, 456.1, 456.3, 456.6, 461
See application file for complete search history.

(56) References Cited

U.S. PATENT DOCUMENTS

| | | | | |
|---|---|---|---|---|
| 7,155,238 | B2 * | 12/2006 | Katz | 455/456.1 |
| 7,890,057 | B2 * | 2/2011 | Kubotani et al. | 455/41.2 |
| 7,949,364 | B2 * | 5/2011 | Kasslin et al. | 455/552.1 |

FOREIGN PATENT DOCUMENTS

JP       A-2007-216920         8/2007
WO    WO 2008/010756 A1 *   1/2008

* cited by examiner

*Primary Examiner* — Hai L Nguyen
(74) *Attorney, Agent, or Firm* — Oliff & Berridge, PLC

(57) ABSTRACT

Devices, methods, and programs for identifying radio communication devices in a subject vehicle perform a first search and second search for radio communication devices in a vicinity of an in-vehicle device and store addresses of the radio communication devices identified by the first search and the second search. The devices, methods, and programs compare the addresses of the radio communication devices searched by the second search with the addresses of the radio communication devices searched by the first search, and determine that a particular radio communication device is inside the subject vehicle if that particular radio communication device's address is identified by both the first search and the second search.

6 Claims, 6 Drawing Sheets

RADIO DEVICE LIST

| RADIO DEVICE | ADDRESS |
|---|---|
| 1. CELLULAR PHONE | 12AE•••4 |
| 2. AUDIO DEVICE | B5C3•••F |
| 3. PDA | 3D68•••A |
| ⋮ | ⋮ |

FIG. 2

DEVICES, METHODS, AND PROGRAMS FOR IDENTIFYING RADIO COMMUNICATION DEVICES

INCORPORATION BY REFERENCE

The disclosure of Japanese Patent Application No. 2008-113425, filed on Apr. 24, 2008, including the specification, drawings and abstract thereof, is incorporated herein by reference in its entirety.

BACKGROUND

1. Related Technical Fields

Related technical fields include in-vehicle devices and programs that are capable of determining whether or not searched radio communication devices are the ones inside a subject vehicle.

2. Related Art

A radio communication system by Bluetooth (a registered trademark, hereinafter referred to as the "BT") is a system in which the radio communication devices (cellular phones, audio devices, notebook computers, PDAs, headsets, and the like) having a built-in module that conforms to the standards and specifications of the BT, which are positioned within a relatively short distance, are connected by a communication link using radio wave of 2.4 GHz of bandwidth to transmit a signal such as data, a sound, and the like.

To use the radio communication devices, as shown in FIGS. 5A and 5B, when searching for the radio communication devices in vicinity by radio wave from a radio communication device 1 having a built-in module that conforms to the BT standards (FIG. 5A), a list of the radio communication devices in a searchable status is displayed (FIG. 5B). When selecting a specific radio communication device from the list, an authentication key input screen is displayed. When an identical authentication key is inputted on both sides, a pairing is established and the radio communication device connected with the radio communication device 1 is enabled. In addition, as for the devices that have been previously authenticated, it is possible to make connection automatically without a user's selection.

In the meantime, in order to perform an appropriate vehicle seat displacement control, a technology is proposed in which a terminal conforming to the BT standards is installed in a vehicle to identify the number of persons riding the vehicle in the vicinity of the vehicle and the existence of cellular phones that the respective persons in the vicinity of the vehicle have is detected by using radio communication based on the BT standards (refer to Japanese Unexamined Patent Application Publication No. 2007-216920).

SUMMARY

According to the BT standards, the communication is available in an area of 10 to 100 m although it depends on the ambient conditions. If a BT device is installed in an in-vehicle navigation device, radio communication devices not only in the subject vehicle but also in the vicinity of the vehicle are searched. So, if the subject vehicle is parked in a parking lot of a huge shopping mall, the radio communication devices in vehicles parked around the subject vehicle are also searched and the radio communication devices in the subject vehicle cannot be determined. The technology of Japanese Unexamined Patent Application Publication No. 2007-216920 is an example in which a radio communication function by the BT standards performing search over the vicinity of the vehicle is rather actively utilized. If the radio communication devices outside the subject vehicle have been searched by the radio communication of the BT standards, the pairing is not established unless the authentication keys on both sides are matched. However, it is not convenient that the radio communication devices inside the subject vehicle cannot be determined.

Exemplary implementations of the broad inventive principles described herein make it possible to determine whether or not the searched radio communication devices are the devices inside the subject vehicle.

Exemplary implementations provide devices, methods, and programs for identifying radio communication devices that perform a first search and second search for radio communication devices in a vicinity of an in-vehicle device and store addresses of the radio communication devices identified by the first search and the second search. The devices, methods, and programs compare the addresses of the radio communication devices searched by the second search with the addresses of the radio communication devices searched by the first search, and determine that a particular radio communication device is inside the subject vehicle if that particular radio communication device's address is identified by both the first search and the second search.

BRIEF DESCRIPTION OF THE DRAWINGS

Exemplary implementations will now be described with reference to the accompanying drawings, wherein:

FIG. 2 shows a list of searched radio communication devices and the addresses.

DETAILED DESCRIPTION OF EMBODIMENTS

Figure 1:
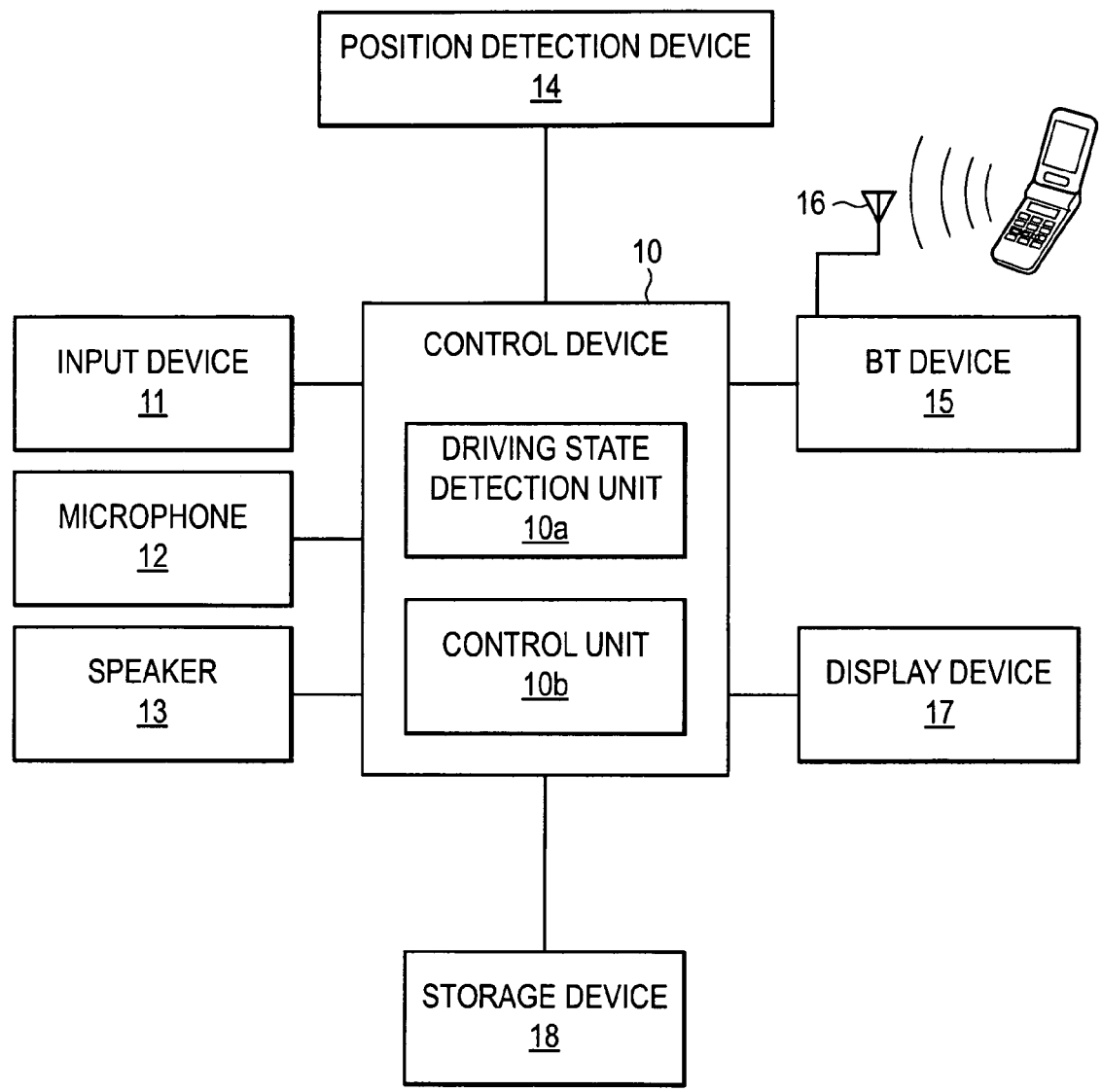
FIG. 1 is a block diagram showing an example of an in-vehicle device.

FIG. 1 is a block diagram showing an example of an in-vehicle device. The in-vehicle device includes: a controller (control device 10) including a computer that controls the whole device; an input device 11 that performs destination setting and the like when a navigation function is used; a microphone 12 and a speaker 13 that are used when communication with other devices is performed or the like; a position detection device 14 such as GPS (Global Positioning System) that detects a current position of a subject vehicle; a BT device 15 that includes a built-in module conforming to the BT communication specifications and standards, for searching for radio communication devices in vicinity through an antenna 16 and performing connection with a selected radio communication device; a display device 17 that displays a map for navigation as well as a list of searched radio communication devices; a storage device 18 that stores map data, data for navigation, guidance data, data regarding searched BT devices, and the like. The control device 10 includes a driving state detection unit 10a that detects whether or not the subject vehicle is driving based on output from the position detection device 14 and a control unit 1 0b that performs determination of whether or not the radio communication devices are the devices in the subject vehicle. When a cellular phone is connected by the BT device 15, for example, the connected cellular phone can be used from the in-vehicle device and it is possible to talk with a person on the line with the cellular phone using the microphone 12 and the speaker 13.

The functions of the control device 10 may be implemented by a computer-executable program executed by the computer controlling the in-vehicle device. The program may be stored in a RAM of the computer or in the storage device 18.

When searching for radio communication devices in vicinity as described before, a list of the searched radio communication devices as shown in FIG. 2 is displayed. In this example, the just-searched radio communication devices and their addresses are stored in the storage device 18. Note that the address of the radio communication device is used to identify a radio communication device, which is a letter string of about 12 digits consisting of the number of 0 to 9 and the alphabet of A to F for example. As described above, the addresses of the searched radio communication devices are stored, and the stored addresses are compared with the addresses of the newly searched radio communication devices. As a result of the comparison, if the addresses are matched, it means that the radio communication devices with the same address have been searched a plurality of times. If the radio communication devices with the same address have been searched a plurality of times in such a way, it can be determined that the radio communication devices are the devices inside the subject vehicle. Thus, the addresses of the searched radio communication devices are used as data for determining whether or not the radio communication devices are the devices inside the subject vehicle. In addition, it is possible to search for radio communication devices a plurality of times at a predetermined timing while the subject vehicle is driving, and determine that the radio communication devices that have been searched every time or a predetermined number of times are the radio communication devices inside the subject vehicle. Further, it is also possible to display by priority the radio communication devices that have been determined as the devices inside the subject vehicle, or display by priority the radio communication devices in vicinity that have been newly detected.

Next, an example of determining whether or not the radio communication devices are inside the subject vehicle is described.

Figure 3A:
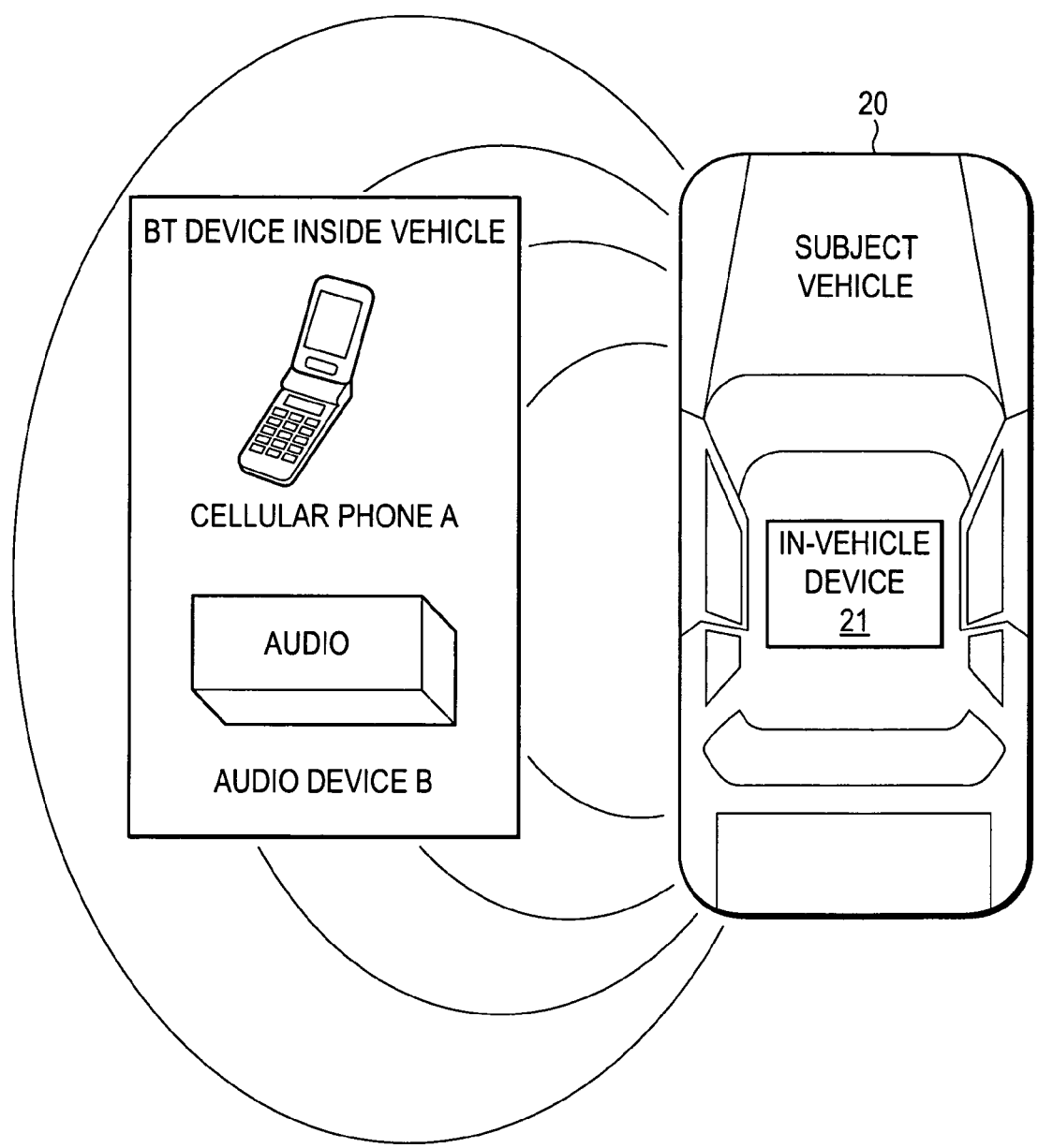
FIGS. 3A and 3B show an example of searching for the radio communication devices inside the subject vehicle while driving, storing the addresses, and determining whether or not the radio communication devices that have been searched when stopped are the radio communication devices inside the subject vehicle.
Figure 3B:
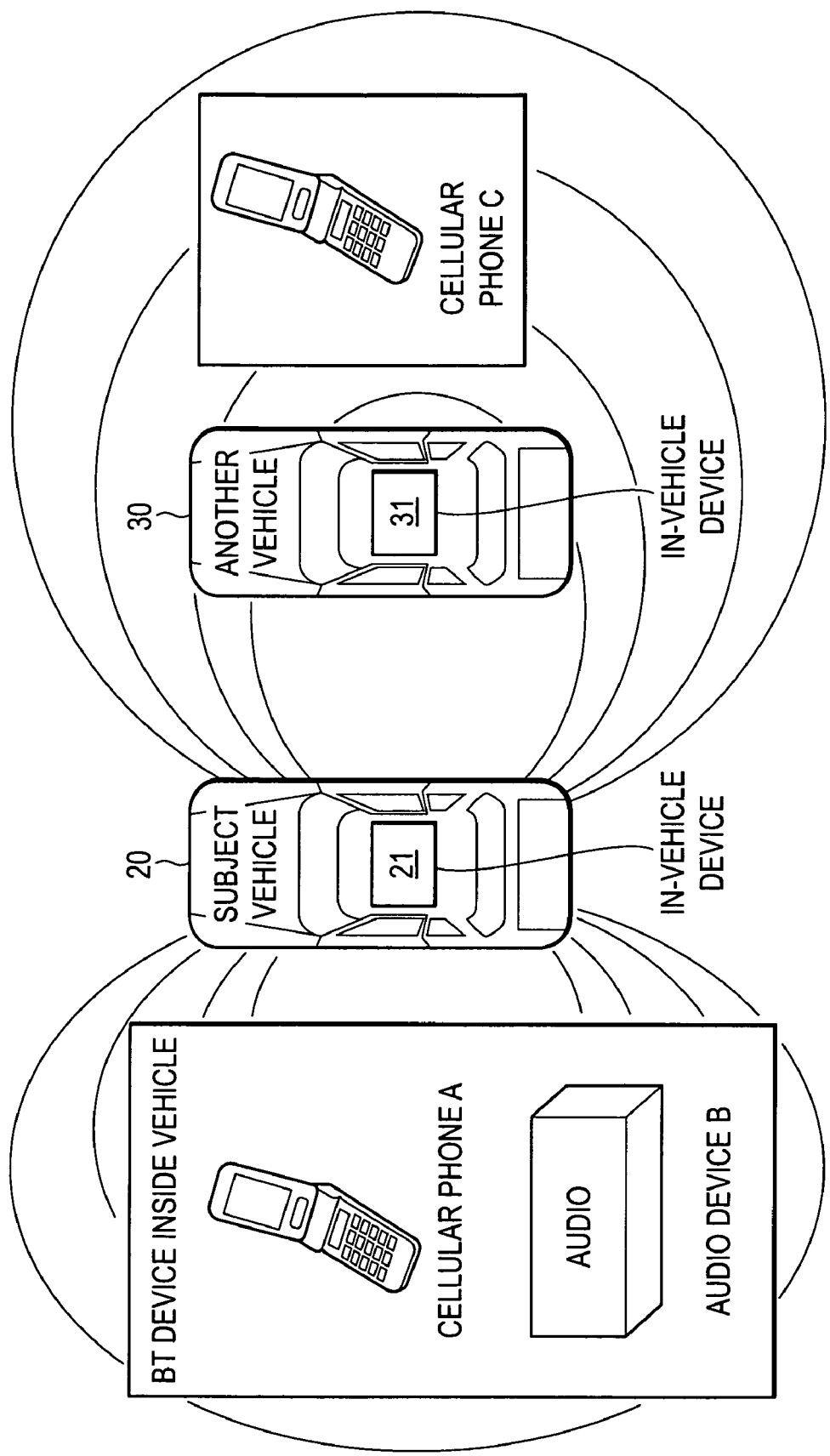

FIGS. 3A and 3B show an example of searching for the radio communication devices inside the subject vehicle while driving, storing the addresses, and determining whether or not the radio communication devices that have been searched when stopped are the radio communication devices inside the subject vehicle.

FIG. 3A shows a case in which an in-vehicle device 21 having the same structure as the one shown in FIG. 1 is installed in a subject vehicle 20, the subject vehicle 20 is driving and there are no other vehicles around, and the radio communication devices in the subject vehicle are searched by the BT communication function of an in-vehicle device 21. In this example, a cellular phone A and an audio device B are searched and their addresses are stored in the storage device.

FIG. 3B shows a case in which when the subject vehicle has been parked, the radio communication devices in another vehicle parked next to the subject vehicle have been searched. A cellular phone C in another vehicle 30 is searched as well as the radio communication devices in the subject vehicle. As described before, the addresses of the radio communication devices inside the subject vehicle that have been searched while driving are stored in the storage device of the in-vehicle device 21. When the addresses are compared, the addresses of the cellular phone A and the audio device B are matched, but the address of the cellular phone C is not matched. In this case, it can be determined that the cellular phone C is not the device inside the subject vehicle but the device in the other vehicle 30 or in another place in vicinity. Then, the address of the cellular phone C is also stored in the storage device. That is, it is determined that the cellular phone C is not a device inside the subject vehicle at the first search, although the cellular phone C may have been brought in the subject vehicle when stopped. However, by storing the address, when the same address is searched at the next search, it can be determined that the cellular phone C was brought in the subject vehicle when stopped. If the same address is not searched afterward, it is assured that the determination of the cellular phone C not being inside the subject vehicle was correct.

Figure 4:
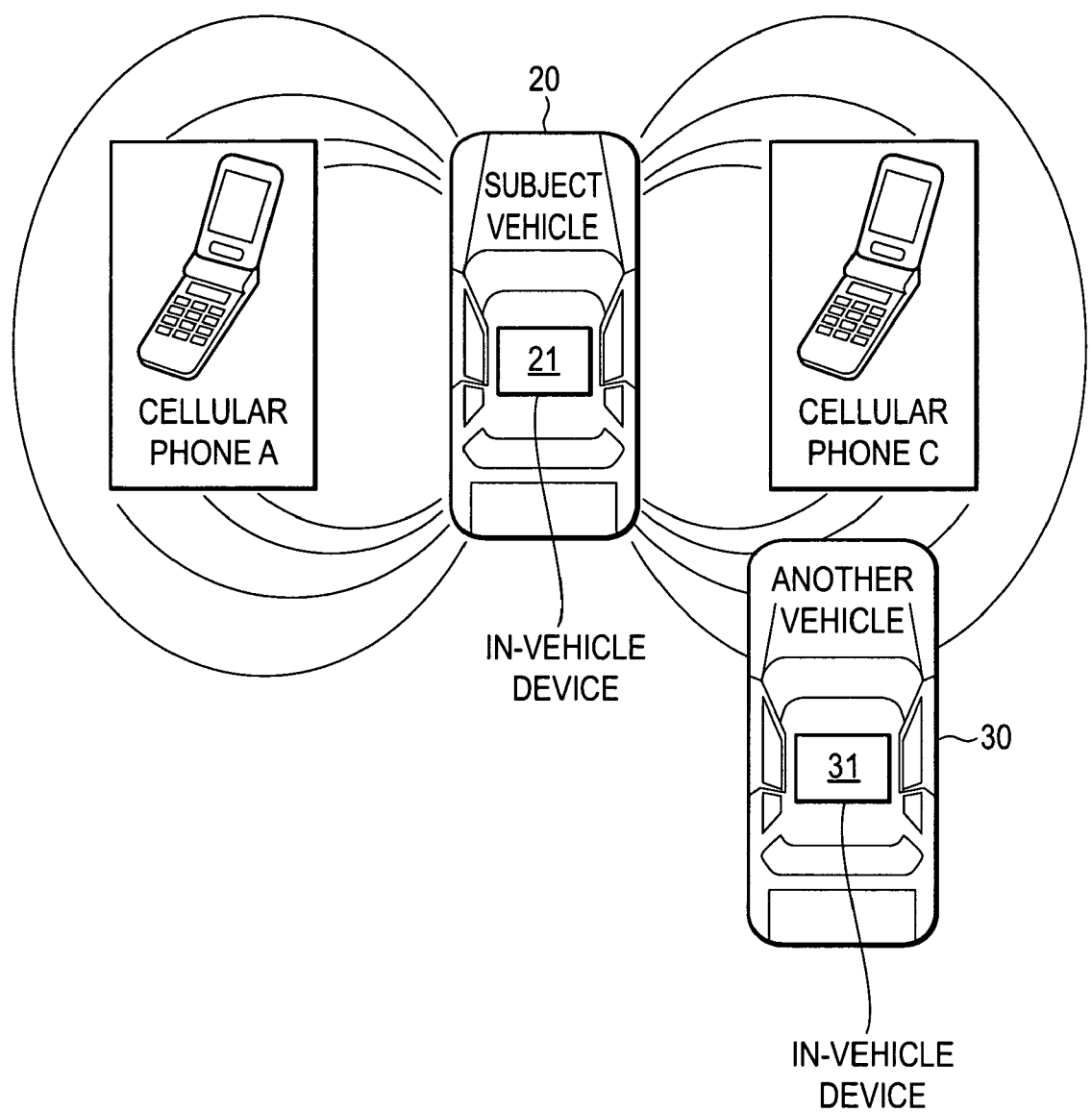
FIG. 4 shows an example of applying a usage regulation of the radio communication devices while driving.
Figure 5A:
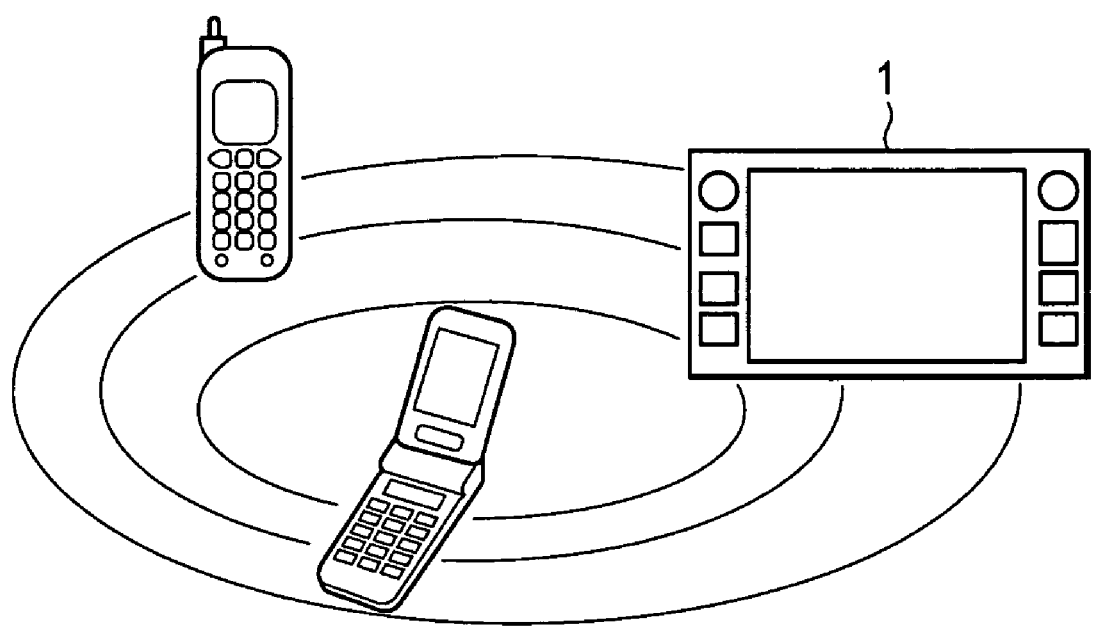
FIGS. 5A and 5B show an example of the use of the radio communication devices.
Figure 5B:
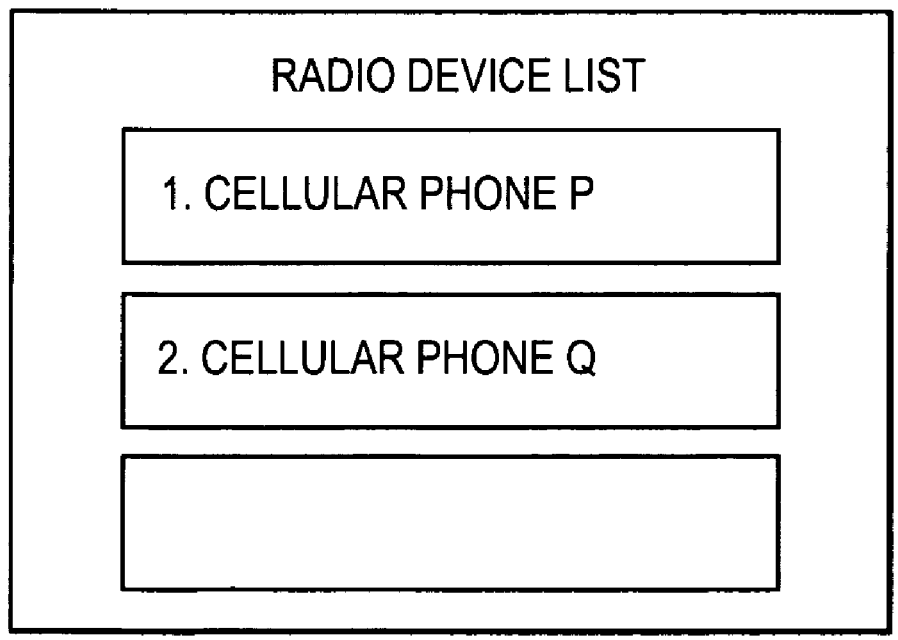

FIG. 4 shows an example of applying a usage regulation of the radio communication devices while driving.

While the subject vehicle 20 is driving, when the other vehicle 30 approaches and the cellular phone A and the cellular phone C are searched, it can be determined, by comparing with the addresses stored in the storage device, that the cellular phone A is the device inside the subject vehicle and the cellular phone C is the device inside the other vehicle. The in-vehicle device sends a signal of "driving" only to the cellular phone A that is inside the subject vehicle. In this way, it is possible to regulate the use of the cellular phone A that is inside the subject vehicle while driving. On the other hand, the cellular phone C can be ignored.

According to the above-described examples, the radio communication devices inside the subject vehicle can be distinguished from other radio communication devices. Therefore, users can easily select a radio communication device when a lot of radio communication devices have been searched.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. An in-vehicle device configured for installation in a subject vehicle, comprising:
    a communication unit that performs a first search and second search to identify radio communication devices in a vicinity of the in-vehicle device;
    a storage unit that stores addresses of the radio communication devices identified by the first search and the second search; and
    controller that:
        determines whether the subject vehicle is driving;
        compares the addresses of the radio communication devices identified by the second search with the addresses of the radio communication devices identified by the first search; and
        determines that a particular radio communication device is inside the subject vehicle if that particular radio communication device's address is identified by both the first search and the second search;
    wherein the controller causes the communication unit to perform the first search and the second search when it is determined that the subject vehicle is driving.

2. The in-vehicle device according to claim 1, wherein the controller:
is configured to regulate the use of radio communication devices while the subject vehicle is driving; and
only regulates the use of the particular radio communication devices determined to be inside the subject vehicle.

3. A navigation device comprising the in-vehicle device of claim 1.

4. A method for identifying radio communication devices in a subject vehicle, comprising:
determining whether the subject vehicle is driving;
when it is determined that the subject vehicle is driving, performing a first search and second search to identify radio communication devices in a vicinity of an in-vehicle device;
storing addresses of the radio communication devices identified by the first search and the second search;
comparing the addresses of the radio communication devices identified by the second search with the addresses of the radio communication devices identified by the first search; and
determining that a particular radio communication device is inside the subject vehicle if that particular radio communication device's address is identified by both the first search and the second search.

5. The method according to claim 4, further comprising:
regulating the use of only the particular radio communication devices determined to be inside the subject vehicle.

6. A computer-readable storage medium storing a computer-executable program usable to identify radio communication devices in a subject vehicle, the program comprising:
instructions for determining whether the subject vehicle is driving;
instructions for, when it is determined that the subject vehicle is driving, performing a first search and second search to identify radio communication devices in a vicinity of the in-vehicle device;
instructions for storing addresses of the radio communication devices identified by the first search and the second search;
instructions for comparing the addresses of the radio communication devices identified by the second search with the addresses of the radio communication devices identified by the first search; and
instructions for determining that a particular radio communication devices is inside the subject vehicle if that particular radio communication device's address is identified by both the first search and the second search.

* * * * *